United States Patent
Hishikawa et al.

(10) Patent No.: US 6,909,938 B2
(45) Date of Patent: Jun. 21, 2005

(54) METHOD OF AND APPARATUS FOR SYNCHRONOUS CONTROL

(75) Inventors: Tetsuo Hishikawa, Yamanashi (JP); Takashi Idei, Fujiyoshida (JP); Kentaro Fujibayashi, Musashino (JP)

(73) Assignee: Fanuc Ltd., Yamanashi (JP)

( * ) Notice: Subject to any disclaimer, the term of this patent is extended or adjusted under 35 U.S.C. 154(b) by 209 days.

(21) Appl. No.: 10/023,944

(22) Filed: Dec. 21, 2001

(65) Prior Publication Data

US 2002/0103567 A1 Aug. 1, 2002

(30) Foreign Application Priority Data

Dec. 28, 2000 (JP) ........................................ 2000-400228

(51) Int. Cl.⁷ .............................................. G06F 19/00
(52) U.S. Cl. ........................... 700/188; 700/19; 700/46; 700/57; 700/63; 700/69; 318/568.2; 318/568.18; 318/560; 318/567.1; 318/571
(58) Field of Search ........................... 700/188, 19, 46, 700/57, 63, 69; 318/568.1, 568.2, 268.18, 560, 571, 568.18

(56) References Cited

U.S. PATENT DOCUMENTS

| | | | | |
|---|---|---|---|---|
| 5,254,923 A | * | 10/1993 | Kanitani ................ | 318/568.11 |
| 5,267,142 A | * | 11/1993 | Kono et al. ................ | 700/46 |
| 5,331,542 A | * | 7/1994 | Itoh ............................ | 700/63 |
| 5,444,343 A | * | 8/1995 | Enomoto et al. ........ | 318/568.11 |
| 5,463,296 A | * | 10/1995 | Fugere et al. ............ | 318/568.2 |
| 5,708,342 A | * | 1/1998 | Nihei et al. .............. | 318/568.18 |
| 5,929,575 A | | 7/1999 | Hyodo | |
| 6,084,372 A | * | 7/2000 | Saylor ...................... | 318/568.1 |
| 6,246,201 B1 | * | 6/2001 | Aderek et al. .............. | 318/632 |

FOREIGN PATENT DOCUMENTS

| | | |
|---|---|---|
| DE | 44 20 598 A | 12/1995 |
| JP | 63-151289 | 10/1988 |
| JP | 05-19832 | 1/1993 |
| JP | 6-138920 | 5/1994 |
| JP | 10-187220 | 7/1998 |
| JP | 2000-15339 | 1/2000 |

\* cited by examiner

*Primary Examiner*—Anthony Knight
*Assistant Examiner*—Thomas Pham
(74) *Attorney, Agent, or Firm*—Staas & Halsey, LLP.

(57) ABSTRACT

A method of and apparatus for synchronous control of a leading element and a follower element in which synchronism is started smoothly and a mechanical shock at the start of synchronism is reduced. When the follower element is started to move to be synchronized with the leading element, motion of the follower element is started before the follower element reaches a start position of the synchronism, and brought into synchronism with the leading element at the start position of synchronism. A positional relationship between the leading element and the follower element in synchronism, and a start position for starting the synchronism of the follower element and the leading element is set. An acceleration control of the follower element is performed between a motion start position preceding the start position of the synchronism and the start position of the synchronism. A position control of the follower element is performed based on position data of the leading element and the set positional relationship after the follower element reaches the start position of the synchronism.

11 Claims, 11 Drawing Sheets

METHOD OF AND APPARATUS FOR SYNCHRONOUS CONTROL

BACKGROUND OF THE INVENTION

1. Field of the Invention

The present invention relates to a control of a machine such as a machine tool, a manufacturing machine and a robot, having a plurality of operational elements, and more particularly to a synchronous control for synchronously driving the operational elements of the machine.

2. Description of Related Art

In control of a machine, such as a machine tool, a manufacturing machine and a robot, having a plurality of operational elements, there is a case where some operational elements are required to be synchronously controlled. In such synchronous control, there is known a synchronous control method in which a leading element and a follower element are designated in the operational elements and the follower element is position-controlled based on position data of the leading element. This synchronous control is known as a synchronous control of "electronic cam" in which variations of positions of the leading element and the follower element are repeated periodically in synchronism. The follower element is connected with a drive system including a drive source such as a servomotor and is position-controlled based on position data of the leading element. With this synchronous control, the follower element operates in synchronism with the leading element.

FIG. 11 is a schematic diagram showing a conventional synchronous control system. In FIG. 11, a servomotor of a follower drive system 2 is driven based on motion commands from a controller 6. The controller 6 stores data on a positional relationship between a leading element of a leading drive system 1 and a follower element of the follower drive system 2 moving in synchronism with each other, obtains position data of the follower element based on the stored positional relationship in synchronism and the position data of the leading element at every predetermined period, and provides motion commands to the follower drive system 2 for driving the follower element based on the obtained position data of the follower element, to thereby position-control the follower element. In this way, the follower element 2 is controlled in synchronism with the leading element 1.

In the conventional synchronous control, there may be produced a large mechanical shock when the follower element which stands still is brought into synchronism with the leading element which is in motion, and therefore velocity of the leading element has to be reduced.

In the conventional synchronous control, for example, the follower element is position controlled to reduce a deviation between a present position of the follower element and a synchronized position when starting motion of the follower element. By this position control, the follower element moves to the synchronized position and reached a synchronized velocity. However, an acceleration of the follower element when it reaches the synchronized position and an acceleration of the follower element required at the synchronized position are much different in direction. As a result, a large mechanical shock is caused in the drive mechanism of the follower element.

SUMMARY OF THE INVENTION

An object of the present invention is to make a smooth start of a synchronism of a follower element with a leading element, and thereby reduce a mechanical shock caused in the start of the synchronism of the follower element.

In the synchronous control method and apparatus according to the present invention, when a follower element is started to move to be synchronized with an operating leading element, motion of the follower element is started before the follower element reached a start position of synchronism with the leading element, and brought into synchronism with the leading element at the start position of synchronism, thereby the synchronism is started smoothly and a mechanical shock in a drive mechanism of the follower element is reduced.

According to the present invention, a positional relationship between the leading element and the follower element in synchronism, and a start position for starting the synchronism of the follower element and the leading element is set; an acceleration control of the follower element is performed between a motion start position preceding the start position of the synchronism and the start position of the synchronism; and a position control of the follower element is performed based on position data of the leading element and the set positional relationship after the follower element reaches the start position of the synchronism.

FIG. 1 is a schematic block diagram showing a principle of the synchronous control method according to the present invention. In FIG. 1, a follower element 8 in a follower drive system 2 is moved to be synchronized with motion of a leading element 7 in a leading drive system 1 under control of a controller. A memory 5 of a controller 3 is provided with a synchronized position profile γ defining a profile of the position of a follower element 8 with respect to the position of the leading element 7 (positional relationship between the follower element 8 and the leading element 7) in synchronism, and a start position P of the synchronism. Position data of the leading element 7m in motion is inputted to the controller 3, and the controller 3 obtains position data of the follower element 8 corresponding to the position of the leading element 7 based on the synchronized position profile γ and the position data of the leading element 7, and issues a motion command based on the obtained position data of the follower element 8. Upon receiving the motion command, a servomotor 4 of the follower drive system 2 starts to drive the follower element 8.

In the synchronous control, in the case where the leading element 7 is in motion and the follower element 8 stands still, the controller 3 starts a motion of the follower element 8 which stands still to bring the follower element 8 into synchronism with the moving leading element 7. In this synchronization process, a start position of synchronism at which the follower element 8 is made in synchronism with the leading element 7 is given, and the follower element 8 is controlled to have the position and velocity to respectively coincide with the position and velocity required in synchronism with the leading element 7 at the start position of synchronism.

The above synchronism is achieved by performing an acceleration control of the follower element from a motion start position which is set to precede the synchronized motion start position to the start position of synchronism. After the synchronism is achieved at the start position of synchronism, the follower element is position-controlled based on the position data of the leading element and the synchronized position profile.

The acceleration control for synchronization may be performed according to a linear acceleration line. In this case, the motion start position is set at a position which precedes the start position of synchronism by a predetermined distance, and the acceleration control of the follower element is performed such that a velocity of the follower element varies linearly along a straight line from the motion start position to the start position of the synchronism.

Alternatively, the acceleration/deceleration control may be performed according to a predetermined acceleration curve for synchronization. In this case, the acceleration control is performed so that the position of the follower element when the acceleration terminates coincides with the start position of the synchronism.

The follower element which is moving in synchronism with the leading element is decelerated and stopped and thereby brought out of synchronism. Deceleration/stop control of the follower element is performed according to a predetermined deceleration curve.

A plurality of follower elements may be controlled in synchronism with the leading element. A plurality of start positions of the synchronism are set respectively for the plurality of follower elements so that the follower elements are independently controlled in synchronism with the leading element. The plurality of follower elements may be a plurality of independent operational members, a plurality of connected operational members or axial components in x-axis direction, y-axis direction and z-axis direction of a single operational member.

A difference between the velocity of the follower element when the follower element reaches the start position of synchronism and the velocity required by the synchronized motion is made small, to thereby a mechanical shock at the start of synchronized motion can be reduced.

DETAILED DESCRIPTION OF THE PREFERRED EMBODIMENTS

Figure 1:
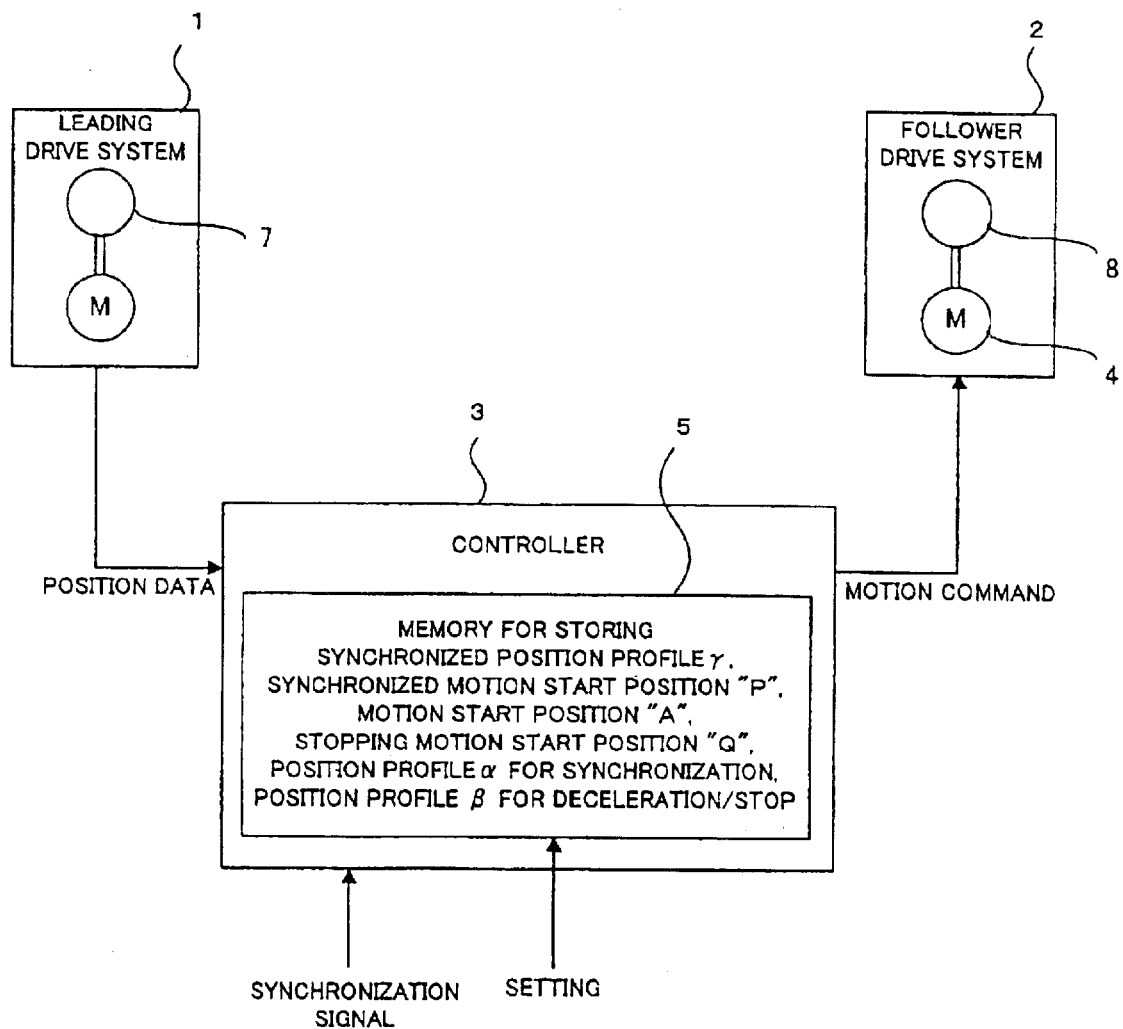
FIG. 1 is a block diagram schematically showing a control system for carrying out the synchronous control method of the present invention.
Figure 2:
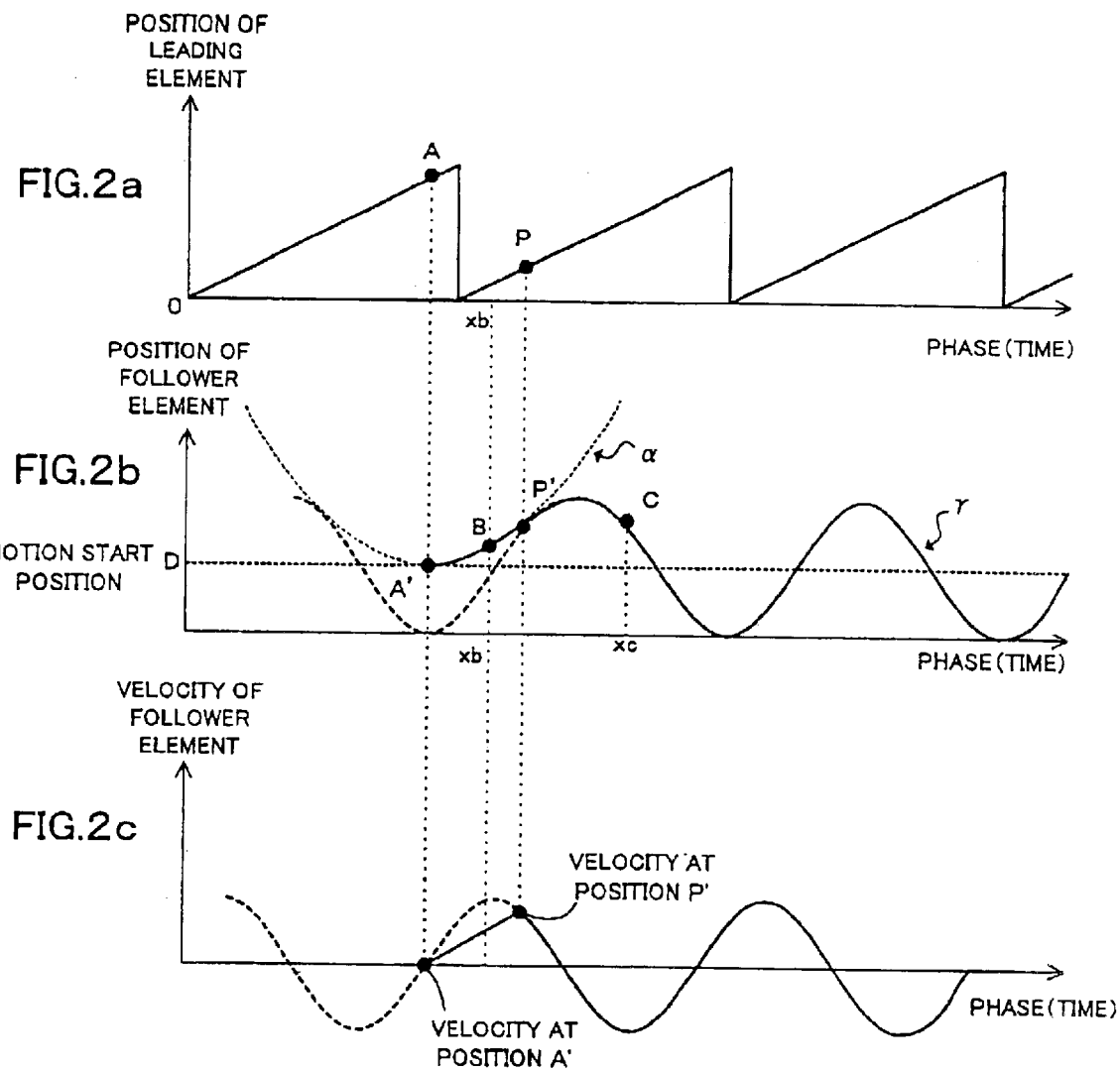
FIGS. 2a–2c are diagrams showing variation of a position of a leading element, and variation of a position and a velocity of a follower element under synchronous control according to first embodiment of the present invention.
Figure 3:
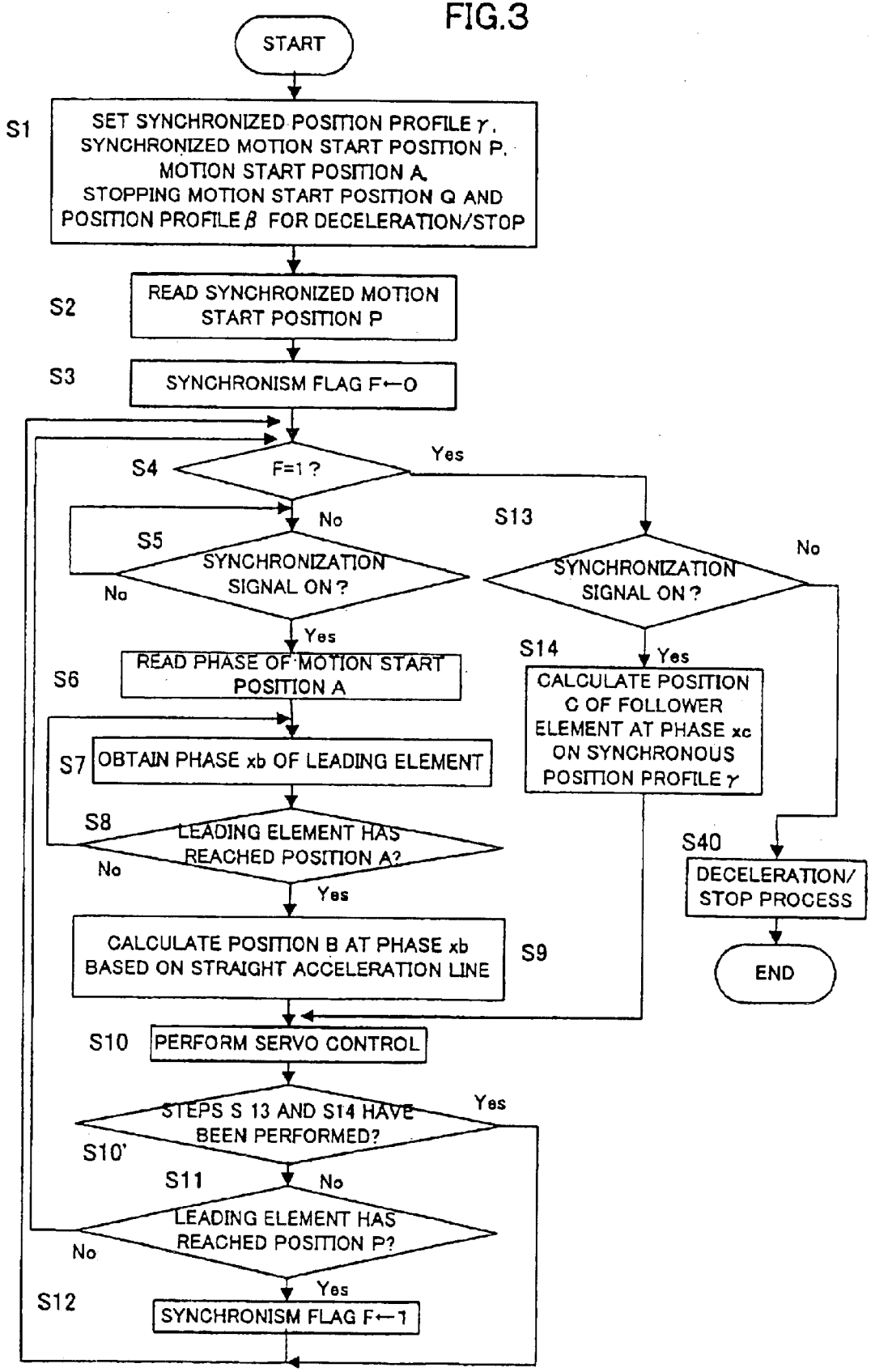
FIG. 3 is a flowchart of procedure and processing for the synchronous control according to the first embodiment.

A first embodiment of the present invention will be described referring to FIGS. 1 to 3. In this embodiment, data on a synchronized position profile γ defining a position of the follower element with respect to the position of the leading element (positional relationship between the leading element and the follower element) in the synchronized motion, a synchronized motion start position P at which the synchronized motion is to be started, a motion start position A which is set to precede the synchronized motion start position P by a predetermined distance and where the follower element is to start its motion, a stopping motion start position Q and a position profile β for deceleration/stop of the follower element are set and stored in the memory 5 of the controller 3 as shown in FIG. 1 (Step S1). The stopping motion start position Q and the position profile β for deceleration/stop are data for use in controlling the follower element moving in synchronism with the leading element to be out of synchronism and decelerating to be stopped. The stopping motion start position Q determines a position where the follower element comes out of the synchronism along the synchronized positional profile γ. The position profile β for deceleration/stop defines a profile of motion of the follower element in deceleration and a position at which the follower element is stopped. These data can be set to the memory 5 of the controller 3 using an input device.

In this embodiment, a linear acceleration/deceleration line is formed using the motion start position A and the synchronized motion start position P and a linear acceleration control is performed for bringing the follower element into synchronism with the leading element. In the following description, the synchronized motion start position P, the motion start position A, and the stopping motion start position Q are given as the positions of the leading element. However, these positions can be given as positions of the follower element using the positional relationship defined by the synchronized position profile γ.

FIG. 2a shows a variation of position of the leading element in a case where the leading element repeats a stroke motion periodically. In FIG. 2a the motion start position and the synchronized motion start position are given as points A and P, respectively. Each of these points is defined by a combination of position and phase of the leading element. However, the positions of these points can be determined based on the phases of the leading element. Thus, the start position A and the synchronized motion start position P can be given either in terms of position or in term of phase.

The processor reads the synchronized motion start position P from the memory 5 (Step S2), and sets a synchronism flag F to "0" (Step S3). The synchronism flag F indicates whether or not the follower element is controlled in synchronism with the leading element along the synchronized position profile γ. In this embodiment, the synchronism flag F=0 indicates that the follower element is not controlled in synchronism with the leading element, and the synchronism flag F=1 indicates that the follower element is controlled in synchronism with the leading element.

If is determined in Step S4 that the synchronism flag F is not set to "1" (F-0), the processor waits for an input of a synchronization signal and performs control other than the synchronous control (Step S5). The synchronization signal functions as a trigger signal to start the synchronous control. The processor performs a synchronizing control for bringing the follower element into synchronism with the leading element and then a synchronized control when the synchronization signal is turned from OFF state to ON state, makes the synchronized control off when the synchronization signal is turned from ON state to OFF state, and does not perform the synchronous control when the synchronization signal remains OFF state.

When it is determined that the synchronization signal has turned ON, the processor reads out the motion start position A from the memory 5 (Step S6), and obtains phase xb of the leading element from inputted present position data thereof (Step S7). In FIGS. 2a–2c, the motion start position A and the present position of the follower element are represented by phases. Data on the present position of the leading element can be obtained from the leading systems 1 at every predetermined period. The processor compares the present position xb of the leading element with the motion start position A, and determines whether or not not present position xb has reached the motion start position A (Step S8).

If it is determined that the position of the leading element has reached the motion start position A, the processor starts the synchronizing process for bringing the follower element into synchronism with the leading element while the leading element moves form the motion start position A to the synchronized motion start position P. In the synchronizing process, the controller obtains the position A' of the follower element which corresponds to the motion start position A of the leading element and the position P' of the follower element which corresponds to the synchronization start position P, so that the velocity of the follower element varies linearly from the velocity at the position A' and the velocity at position P'.

In FIG. 2b, a curve α is a parabola which is sharing a common tangent with the synchronized position profile γ at the synchronized motion start position P' and tangent to a straight line passing through the motion start position D of the follower element. The intersection A' where the curve α and the line D indicating the motion start position of the follower element cross each other defines a point of starting the motion of the follower element. After the follower element starts its motion, the follower element moves along a part of the curve α indicated by a solid-line, and then comes into synchronism with the leading element at the synchronized motion start position P'. In the case where change of the phase of the leading element is constant as in the case of FIGS. 2a–2c, the phase may be deemed as time. Thus, the follower element moves from the position A' to the position P' with the velocity varying along a straight line as shown in FIG. 2c.

In the synchronizing control from the position A' to the position P', the position B of the follower element at the phase xb is calculated using the straight line as an acceleration line (Step S9). Then, a distribution pulse is formed based on the calculated position B to drive the servomotor (Step S10). By this servo control, the synchronism of the follower element with the leading element is achieved.

The processor monitors whether or not the phase of the leading element has reached the phase of the synchronized motion start position P, and repeats the above-mentioned Steps S4 to S10 until the leading element reaches the synchronized motion start position P (Step S11). When the position of the leading element has reached the synchronized motion start position P, the synchronizing process is terminated. When the synchronism of the leading element and the follower element is achieved, the synchronism flag F is set to "1" (Step S12) and the synchronized control process is performed according to the synchronized position profile γ. It is to be noted that Steps S11 and 12 do not need to be performed if Steps S13 and 14 have been performed (Step 10').

If it is determined in Step S4 that the synchronism flag F is set to "1", it means that the synchronized control is being performed. Thus, the processor determines whether the synchronization signal is in ON state or the synchronization signal has switched from ON state to OFF state (Step S13). If the synchronization signal is in ON state, the processor calculates the position C of the follower element (in FIG. 2b) at the present phase xc of the leading element on the synchronized position profile γ (Step S14), and performs servo control based on the calculated position C (Step 10).

If it is determined in Step 13 that the synchronization signal has changed from ON state to OFF state, the synchronized control is to be terminated. Thus, the processor makes the synchronized control off by performing deceleration/stop process to thereby stop the follower element (Step S40).

In the case shown in FIG. 2b, the position P' of the follower element corresponding to the synchronization start position P is located near a peak of the synchronized position profile γ. However, the position P' may be located at any point of the synchronized position profile γ.

Second embodiment of the present invention will be described referring to FIGS. 1, 4 and 5.

In the second embodiment, data on a synchronized position profile γ defining a positional relationship between the leading element and the follower element in the synchronized motion, a synchronization start position P at which the synchronized motion is to be started, a position profile α for synchronization process, a stopping motion start position Q, and a position profile β for deceleration/stop are set and stored in the memory 5 of controller 3 shown in FIG. 1(Step S21). By defining the position profile α for synchronizing process so that there is only a small difference between a velocity of the follower element on the position profile α for synchronization process and a velocity of the follower element on the synchronized position profile γ at the synchronized motion start position P, a mechanical shock produced at the start of synchronized motion can be reduced. These data can be set to the memory 5 of the controller 3 using an input device.

In the second embodiment, acceleration/deceleration control is performed according to an acceleration/deceleration curve for synchronization process with an end thereof being set to coincide with the synchronized motion start position. In the following description referring to FIGS. 4 and 5, the synchronized motion start position P and the stopping motion start position Q are given as positions of the leading element. However, the synchronization start position P and the stopping motion start position Q can be given as positions of the follower element using the positional relation represented by the synchronized position profile γ.

Figure 4:
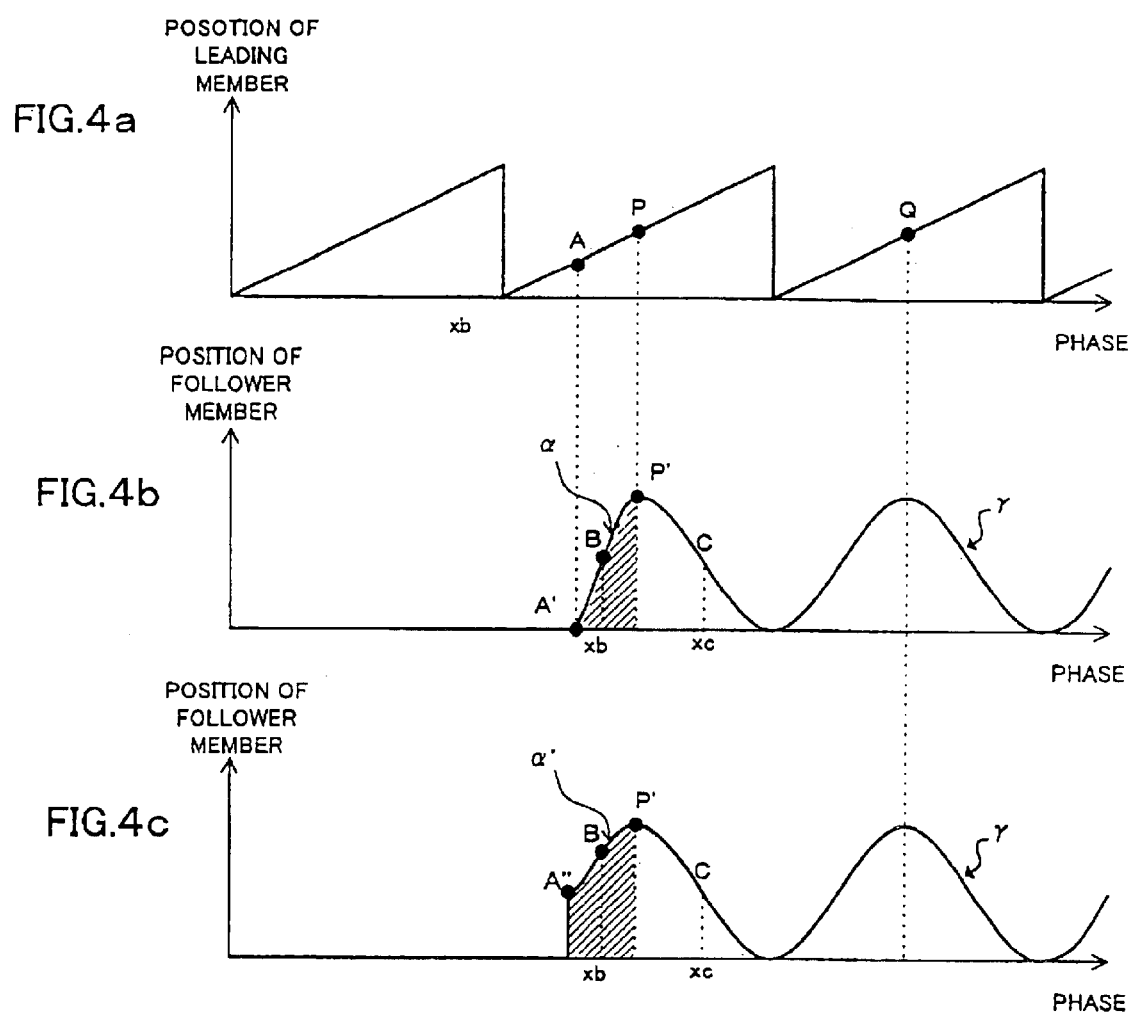
FIGS. 4a–4c are diagrams showing variation of positions of the leading element and the follower element under synchronous control according to a second embodiment of the present invention.
Figure 5:
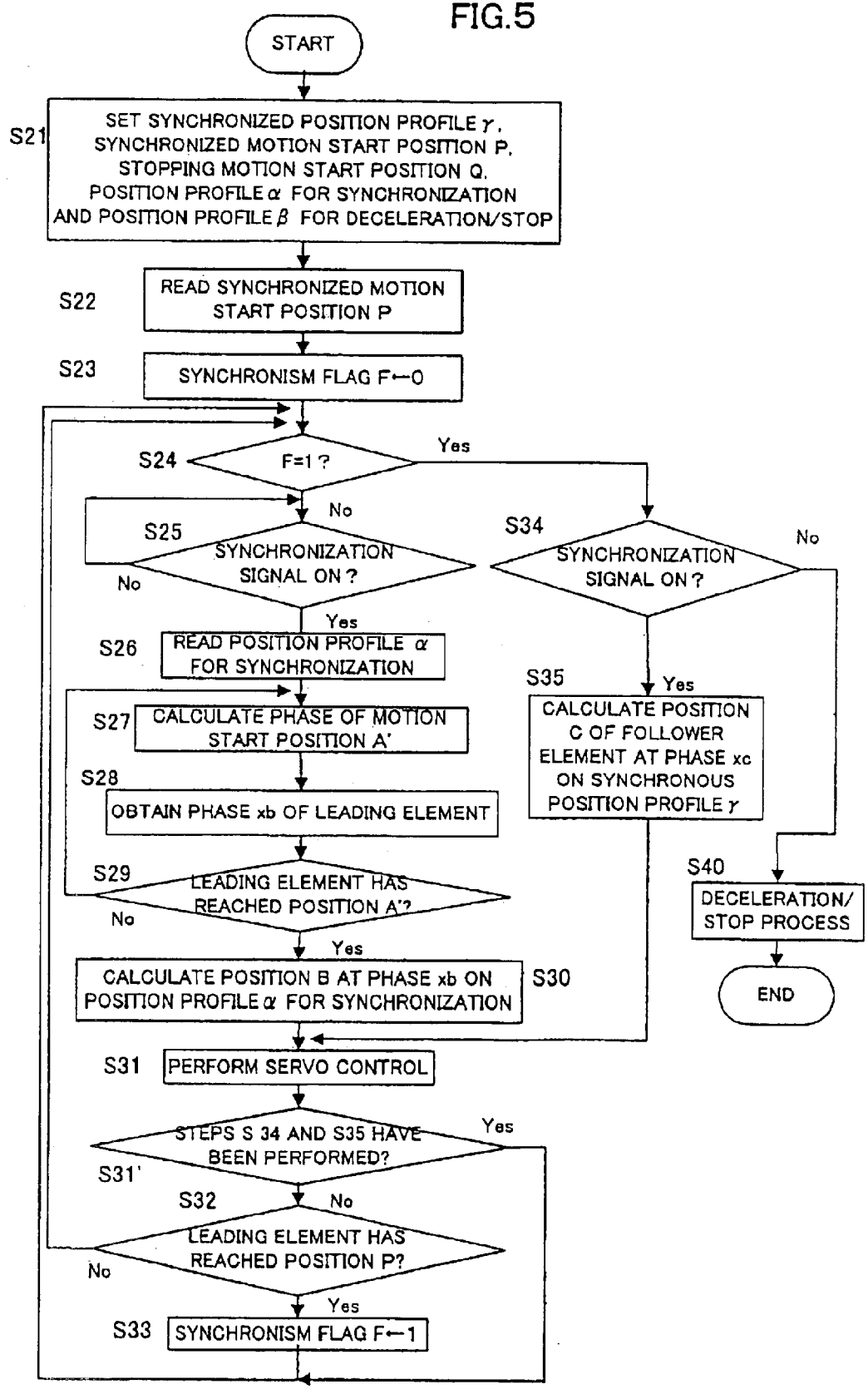
FIG. 5 is a flowchart of procedure and processing for the synchronous control according to the second embodiment.

Like the case shown in FIG. 2a, FIG. 4a shows the case where a leading element repeats a stroke motion periodically. The synchronization start position P is given as a point P in FIG. 4 a.

The processor of the controller 3 reads the synchronization start position P from the memory 5 (Step S22), and set a synchronism flag F to "0" (Step S23). The synchronism flag F is used in the same way as described in connection with Step S3 in FIG. 3.

If it is determined in Step S24 that the synchronism flag is set to 0, the processor waits for a synchronization signal inputted, and performs control other than the synchronous control. The processor performs the synchronization control and the synchronized control when the synchronization signal is in ON state, terminates the synchronized control when the synchronization signal has switched from ON state to OFF state, and does not perform the synchronous control when the synchronization signal remains OFF state (Step S25).

When it is determined that the synchronization signal has turned into ON state, the processor reads the position profile α for synchronization control from the memory 5 (Step S26) and calculates a motion start position A' at which the synchronization process of the follower element is to be started based on the position profile α (Step S27). The position profile α for synchronization defines as an acceleration/deceleration curve of the motion of the follower element from the motion start position A' to a synchronized motion start position P'.

The present position xb of the leading element is obtained from inputted present position data thereof (Step S28). In FIG. 4, the synchronized motion start position P and the present position xb of the leading element are represented by phase. Data on the position of the leading element can be inputted from the leading drive system 1 at every predetermined period. The processor compares the phase xb of the leading element and the phase of the motion start position A', and determines whether or not the phase of leading element has reached the phase of the motion start position A' (Step S29).

When the phase xb of the leading element has reached the phase of the motion start position A', the processor performs the synchronization control according to the position profile α for synchronization to hereby make the follower element move from the motion start position A' to the synchronization start position P'. In the synchronization control, the position B of the follower element at the phase xb on the position profile α for synchronization is calculated (Step S30). Then, distribution pulses are formed based on the calculated position B to drive the servomotor (Step S31). By this servo control, the synchronism of the follower element with the leading element is achieved.

The processor monitors whether or not the position xb of the leading element has reached the synchronized motion start position P, and repeats the abovementioned Steps S24 to S31 until the position xb of the leading element reached the synchronized motion start position P (Step S32). The time when the position xb of the leading element has reached the synchronization start position P is the time when the synchronization adjustment should end. After that, the synchronization flag is set to 1 and synchronous control is performed according to the synchronized position profile γ (Step S33).

If it is determined in Step S24 that the synchronism flag F is set to "1", it means that the synchronized control is being performed. Thus, the processor determines whether the synchronization signal is in ON state or the synchronization signal has switched from ON state to OFF state (Step S34). If the synchronization signal is in ON state, the processor calculates the position C of the follower element (in FIG. 4b) at the present phase xc of the leading element on the synchronized position profile γ (Step S35), and performs servo control based on the calculated position C (Step 31). It is to be noted that Steps S32 and 33 do not need to be performed if Steps S34 and 35 have been performed (Step S31').

If it is determined in Step 34 that the synchronization signal has changed from ON state to OFF state, the synchronized control is to be terminated. Thus, the processor makes the synchronized control off by performing deceleration/stop process to thereby stop the follower element (Step S40).

In the case shown in FIG. 4b, the position P' of the follower element corresponding to the synchronized motion start position P is located at the peak of the synchronized position profile γ. However, the position P' may be located at any point of the synchronized position profile γ. Further, in the case shown in FIG. 4b, the motion start position A' of the follower element is located on a base position (zero position). However, the position A' may be set at any position where the follower element does not interfere with the leading element or other follower elements. FIG. 4c shows the case where the motion start position A" of the follower element is set off the base position. The position profile α' for synchronization process for this case can be defined by modifying the position profile α with the position A' located on the base position. The synchronization control and synchronized control using the position profile α' for synchronization process can be performed in the same way as in the case of FIG. 4b.

Figure 6A:
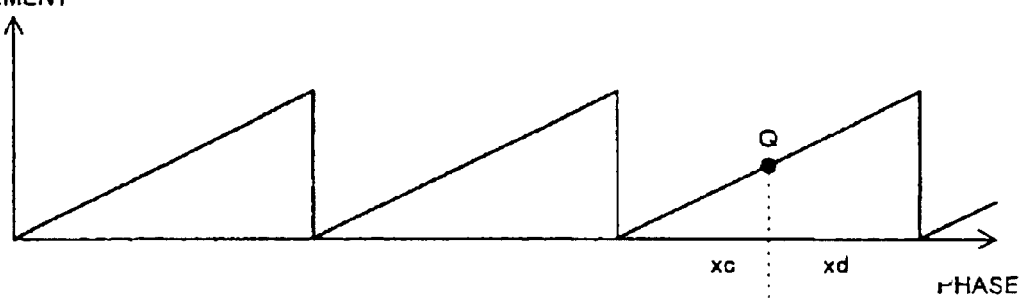
FIGS. 6a and 6b are diagrams showing variation of positions of the leading element and the follower element in deceleration/stop process according to the present invention.
Figure 6B:
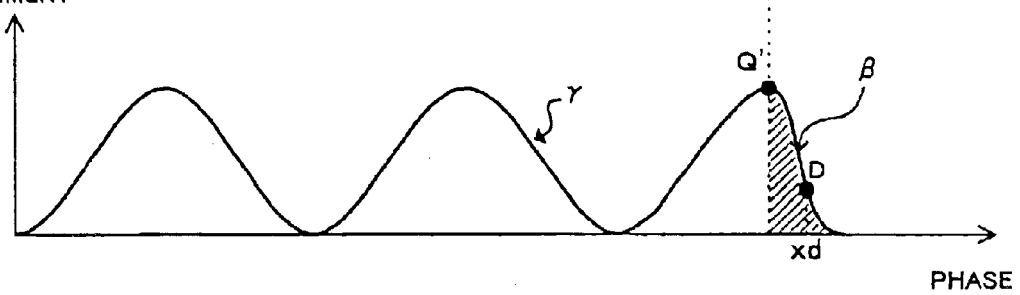
Figure 7:
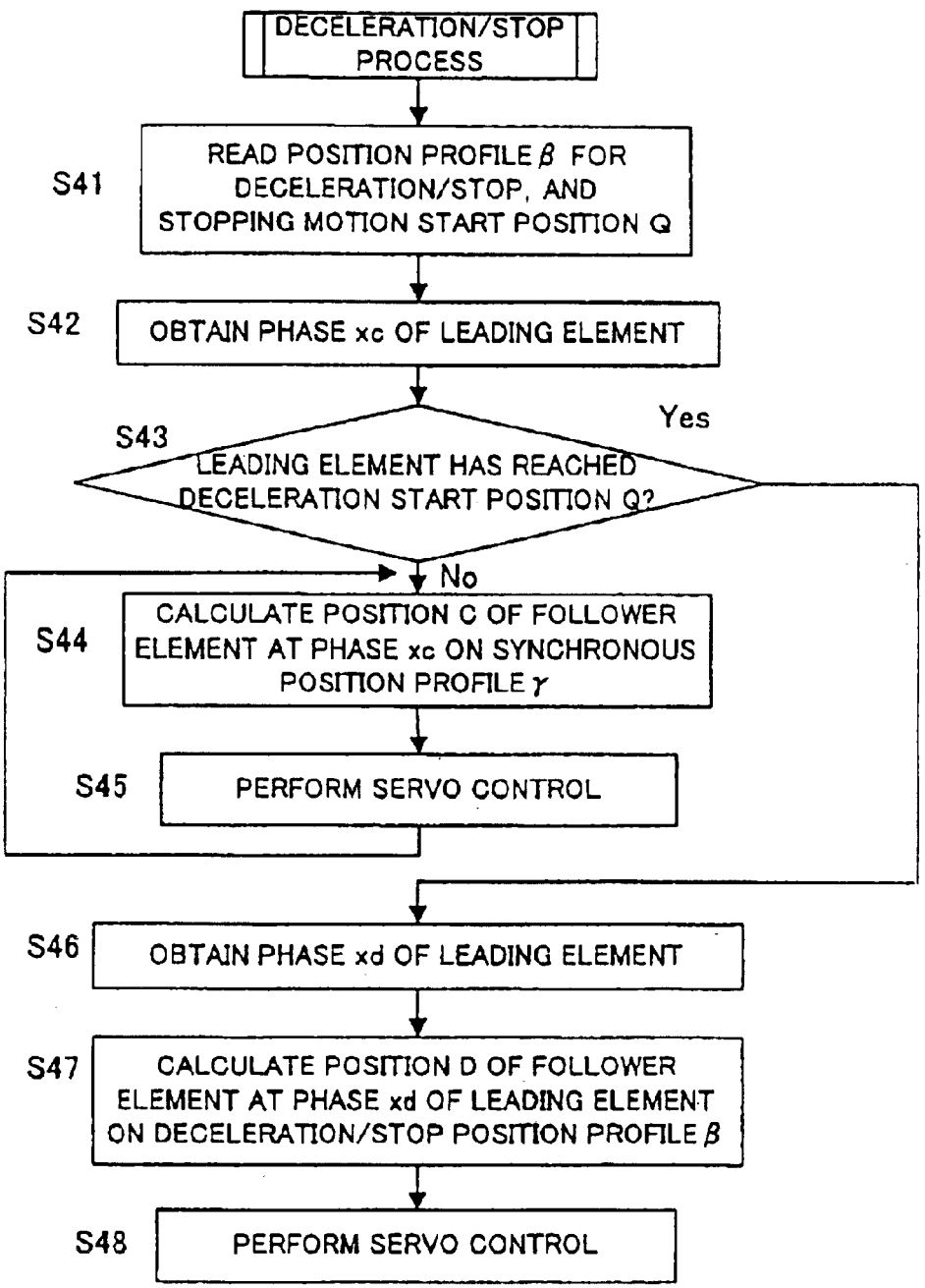
FIG. 7 is a flowchart of the deceleration/stop process.

The deceleration/stop process in Step S40 will be described referring to FIGS. 6 and 7.

The processor of the controller 3 reads the position profile β for deceleration/stop and the stopping motion starting position Q from the memory 5 (Step S41). The stopping motion start position Q is given in the term of phase of the leading element. The present phase xc of the leading element is obtained (Step S42), and if the phase xc has not reached the stopping motion start position Q, a servo control is performed according to the synchronized position profile γ until the phase x reached the stopping motion starting position Q. The servo control is performed as in Steps S14, 10 and Steps S35, 31 described above. Specifically, the position of the follower element corresponding to the phase xc of the leading element on the synchronized position profile γ is calculated, and distribution pulses are formed on the basis of the calculated position and issued to the servo system (Steps S43, 44, 45).

When the phase xc reaches the stopping motion start position Q (Step S43), the follower element is decelerated to be stopped according to the position profile β for deceleration/stop. Specifically, the phase xc of the leading element is obtained (Step S46), the position D of the follower element at the phase xs is calculated on the position profile β for deceleration/stop (Step S47), and distribution pulses are formed based on the calculated position D and given to the servo system of the follower element (Step S48).

In the synchronous control and device according to the present invention, there may be provided a plurality of follower elements. For example, a three follower elements are provided for motions in three axial directions. Such arrangement will be described referring to FIGS. 8 and 9.

FIG. 8a shows that a leading element performs a stoke motion periodically, and FIG. 8b shows variation of position of three follower elements (first, second and third follower elements) in synchronism with the leading element. Synchronized position profiles γ1, γ2 and γ3 for the first, second and third follower elements are provided respectively. The first, second and third follower elements move according to the position profiles γ1, γ2, γ3, respectively, in synchronism with the motion of the leading element. The phases of the first, second and third follower elements may be displaced to be different or independent from each other. For example, the phases may be set such that the positions of the first, second and third follower elements corresponding to the position U of the leading element are V1, V2 and V3, respectively. The synchronized position profiles γ1, γ2, γ3 may be set different or the same.

The first, second and third follower elements may be three separate members or three components of a single follower member.

Figure 9:
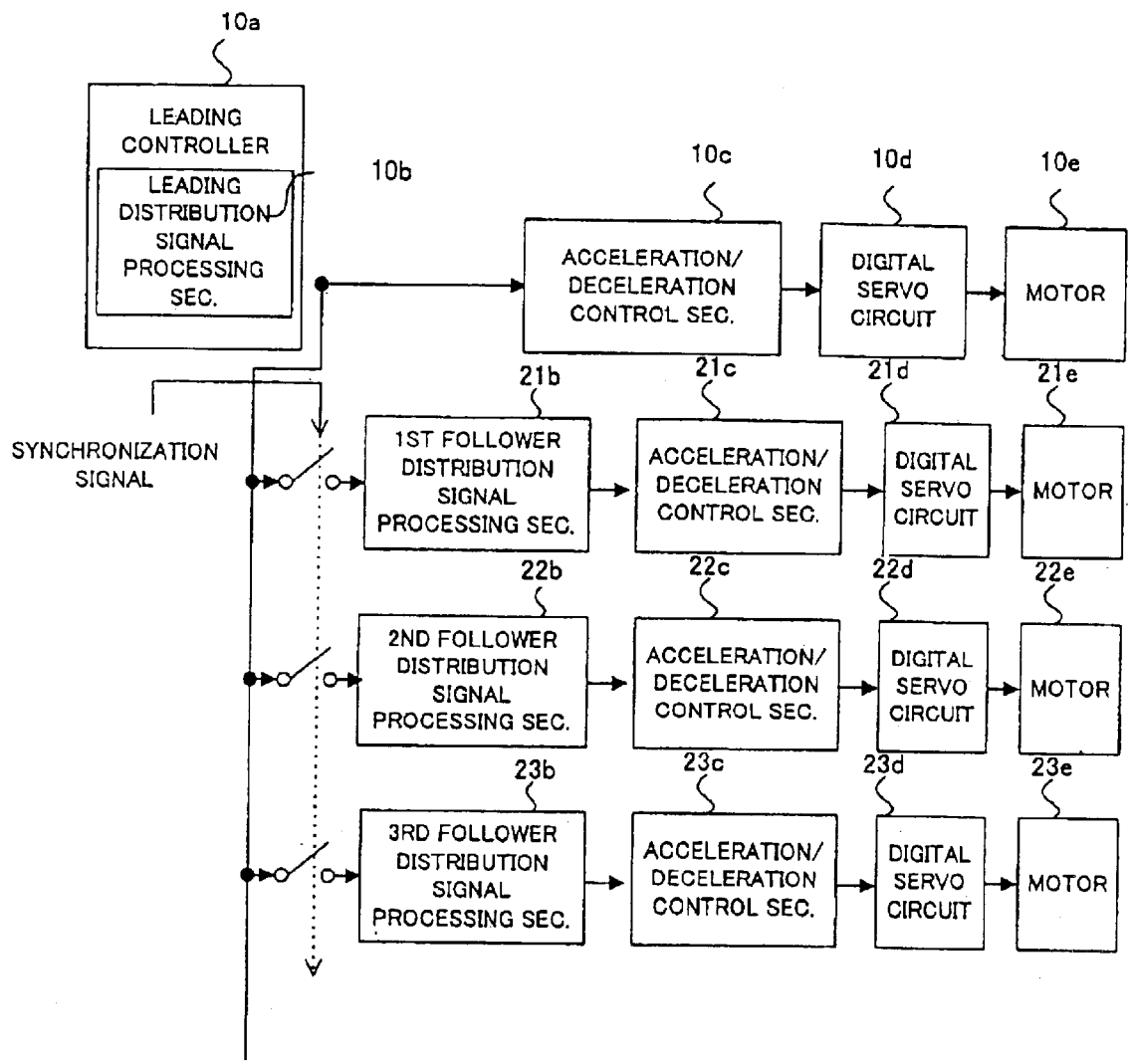
FIG. 9 is a block diagram showing an example of a control apparatus for synchronously controlling a plurality of follower elements.

The control of the plurality of follower elements selectively applying the synchronous control on any of the follower elements can be performed, for example, with an arrangement shown in FIG. 9. In FIG. 9, a leading controller includes a leading control section 10a, an acceleration/deceleration control section 10c, a digital servo circuit 10d and a servomotor 10e. The acceleration/deceleration control section 10c receives distribution signals from a leading distribution signal processing section 10b in the leading control section 10a to thereby drive the servomotor 10e for driving the leading element.

The follower system includes first, second and third follower distribution signal processing sections 21b, 22b, 23b, acceleration/deceleration control sections 21c, 22c, 23c, digital servo circuits 21d, 22d, 23d, and servomotors 21e, 22e, 23e. The first, second and third follower distribution signal processing sections 21b, 22b, 23b receive distribution signals from the leading distribution signal processing section 10b, and produce distribution signals for respective follower elements to issue them to the respective acceleration/deceleration sections 21c, 22c, 23c.

The synchronous control of the first, second, third elements can be selectively applied by a switching device provided between the leading distribution signal processing section 10b and the first, second and third follower distribution signal processing sections 21b, 22b, 23b. The switching is performed by ON or Off state of the synchronization signal.

Figure 8:
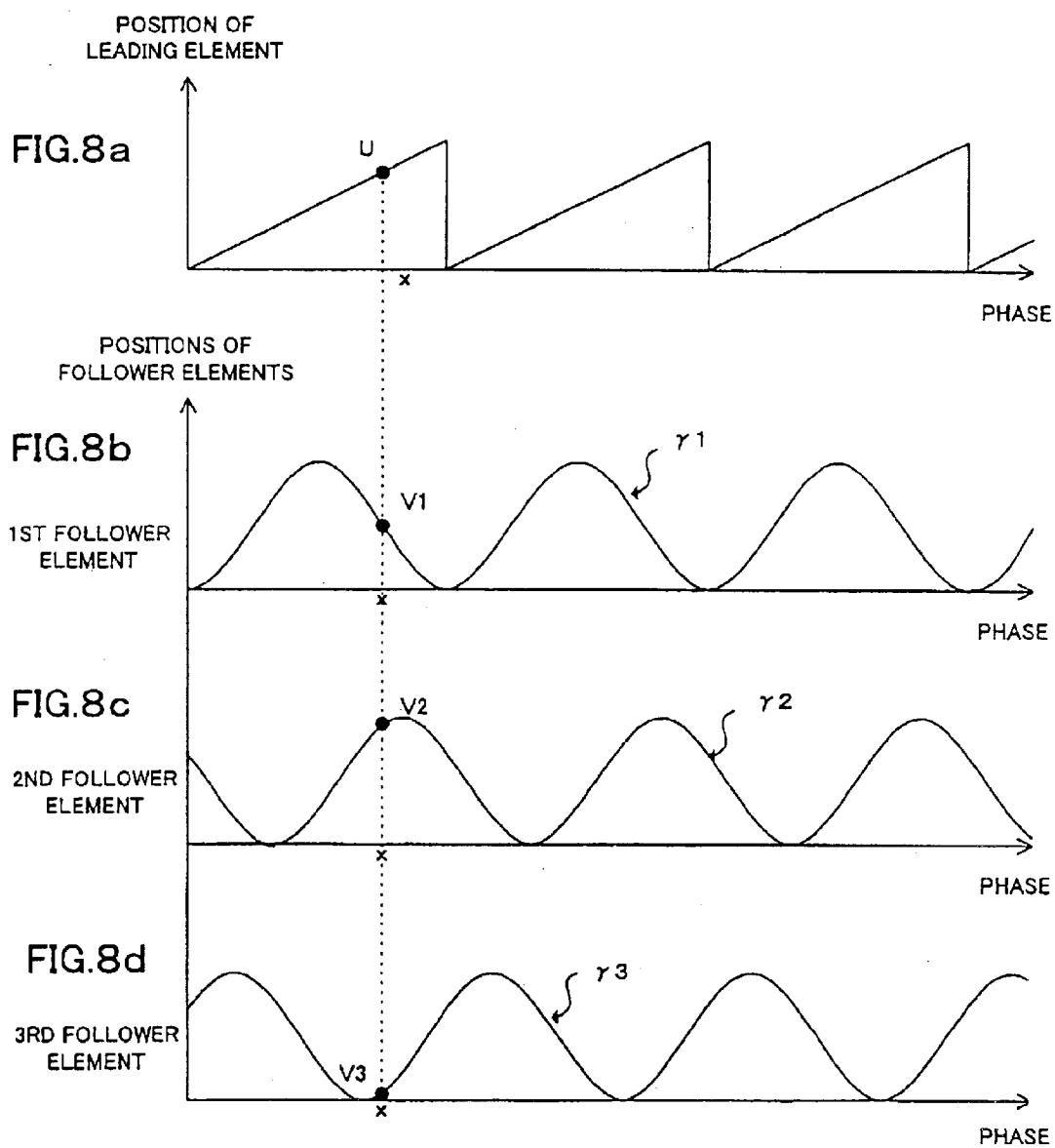
FIGS. 8a–8d are diagrams showing positional relationship between a plurality of follower elements.

Although FIGS. 8 and 9 shows an example in which three follower elements are provided, the number of follower elements is not restricted so that any number of follower elements may be provided.

Figure 10:
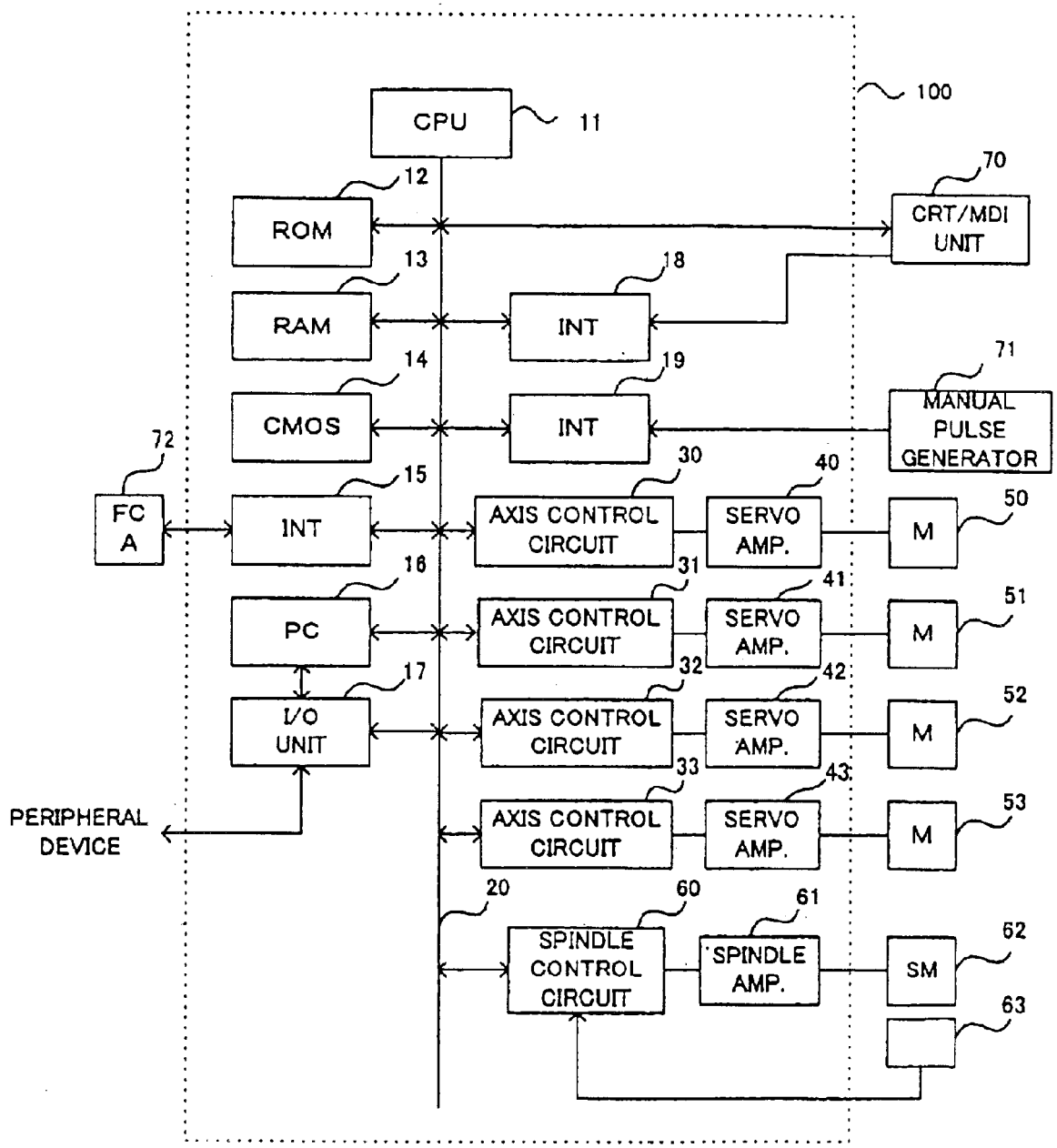
FIG. 10 is a block diagram of a numerical controller for carrying out the synchronous control method of the present invention.
Figure 11:
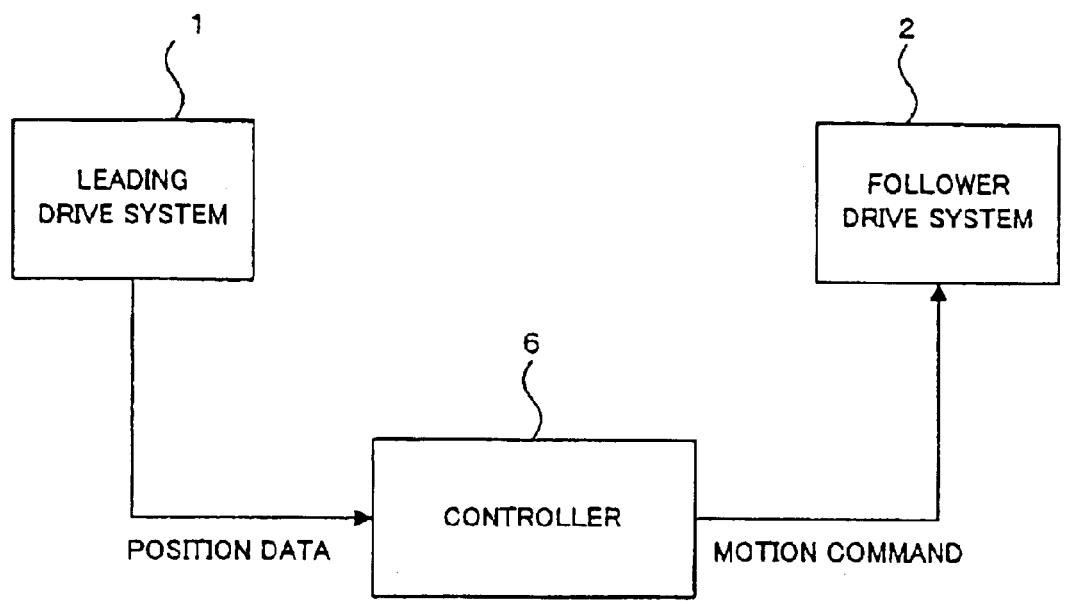
FIG. 11 is a schematic diagram of a conventional synchronous control system.

The synchronous control method according to the present invention can be carried out using a numerical controller. FIG. 10 is a block diagram of a numerical controller 100 for carrying out the synchronous control method according to the present invention. A CPU 11 is a processor for controlling the entire numerical controller 100. The CPU 11 reads a system program stored in a ROM 12 through a bus 20 and controls the entire numerical controller according to the system program. A RAM 13 stores temporary calculation data, display data and data of various kinds which an operator inputs through a CRT/MDI unit 70. A CMOS memory 14 is a non-volatile memory which is backed up with a battery (not shown) so that what is stored therein may be maintained even when power supplied to the numerical controller 100 is turned off. The CMOS memory 14 stores machining programs taken in through an interface 15, machining programs inputted with the CRT/MDI unit 70, etc. In the ROM 12 are written in advance a variety of system programs for executing edit-mode processing, which is needed for making and editing machining programs, and processing for automatic operation The program for synchronous control according to the present invention can be written in the ROM 12, etc. Data such as the position profile α for synchronization process, the position profile β for deceleration/stop, the synchronized position profile γ, the synchronized motion start position P, the motion start position A, the stopping motion start position Q, etc, can be inputted through the interface 15 or the CRT/MDI unit 70 and stored in the CMOS 14.

The interface 15 enables connection of the numerical controller 100 with an external device 72 such as an adaptor. From the external device 72, machining programs and the parameters α, β, γ, P, A, Q, etc. for the synchronous control are taken in. Machining programs edited in the numerical controller 100 can be stored in an external storage device through the external device 72. A PC (programmable controller) 16 sends signals to a peripheral device of a machine tool (for example, an actuator such as a robot hand for changing tools) through an I/O unit 17 to thereby control the peripheral device, according to a sequence program stored in the numerical controller 100. Also, the PC 16 receives signals from various switches on an operation panel attached to a body of the machine tool and sends them to the CPU 11 after effecting necessary processing on the signals. The signals from the machine can be used as the synchronization signal in the present invention.

The CRT/MDI unit 70 is a manual data input device including a display, a keyboard, etc. An interface 18 receives commands and data from the keyboard of the CRT/MDI unit 70 and sends them to the CPU 11. An interface 19 is connected with a manual pulse generator 71 to receive pulses therefrom. The manual pulse generator 71 may be provided at the operation panel. The respective axes are controlled with distribution pulses formed by manual operation of the manual pulse generator 71, so that the tool may be placed in position accurately.

Each of axis control circuits 30 to 33 for each axis receives motion commands for each axis from the CPU 11 and sends commands to the associated one of the servo amplifiers 40 to 43. Upon receiving the commands, the servo amplifiers 40 to 43 drive servomotors 50 to 53 of associated axes, respectively. Each of the servomotors 50 to 53 includes a position/speed detector, and feed position/speed feedback signals from the position/speed detector are fed back to the associated one of axis control circuits 30 to 33 to perform position/speed feedback control. In FIG. 10, the position/speed feedbacks are not illustrated.

The leading and follower control systems may be constituted by the axis control circuits 30–33, servo amplifiers 40–43 and servomotors 50–53. Any of the control systems may be designated to the leading system and the follower system by setting.

A spindle control circuit 60 receives a spindle rotation command and sends a spindle speed signal to a spindle amplifier 61. Upon receiving the spindle speed signal, the spindle amplifier 61 makes a spindle motor 62 rotate at the rotation speed specified by the command. A position coder 63 sends feedback pulses to the spindle control circuit 60 representing the velocity of the spindle motor 62 for velocity control. It is to be noted that the spindle control can be performed independently of the synchronous control of the present invention.

The CPU 11 performs the synchronous control upon receiving a synchronization signal from the CRT/MDI unit 70 and/or the machine, according to a synchronous control program stored in the ROM 12 using the parameters stored in the CMOS 14.

As described above, according to the present invention, the synchronized motion of the follower element with the leading element can be started smoothly, and a mechanical shock which may be produced in the drive system for the follower element can be reduced.

What is claimed is:

1. A synchronous control method for controlling a follower element in synchronism with a leading element, comprising:

setting a positional relationship between the leading element and the follower element in synchronism, and a start position for starting the synchronism of the follower element and the leading element;

performing an acceleration control of the follower element between a motion start position preceding the start position of the synchronism and the start position of the synchronism; and performing a position control of the follower element based on position data of the leading element and the set positional relationship after the follower element reaches the start position of the synchronism.

2. A synchronous control method according to claim 1, wherein said motion start position is set at a position preceding the start position of the synchronism by a predetermined distance, and the acceleration control of the follower element is performed such that a velocity of the follower element varies linearly along a straight line from the motion start position to the start position of the synchronism.

3. A synchronous control method according to claim 1, wherein the acceleration control is performed according to a predetermined acceleration curve so that the position of the follower element when the acceleration terminates coincides with the start position of the synchronism.

4. A synchronous control method according to claim 1, wherein the follower element is decelerated to be stopped according to a predetermined deceleration curve so that the follower element is brought out of the synchronism.

5. A synchronous control method according to claim 1, wherein a plurality of start positions of the synchronism are set respectively for a plurality of follower elements so that the follower elements are independently controlled in synchronism with the leading element.

6. A synchronous control apparatus for controlling a follower element in synchronism with a leading element, comprising:

memory storing data on a positional relationship between the leading element and the follower element in synchronism, and data on a start position for starting the synchronism of the follower element and the leading element;

acceleration controller performing an acceleration control of the follower element between a motion start position preceding the start position of the synchronism and the start position of the synchronism; and position controller performing a position control of the follower element based on position data of the leading element and the set positional relationship after the follower element reaches the start position of the synchronism.

7. A synchronous control apparatus according to claim 6, wherein said memory stores data on the motion start position of the follower element, a linear acceleration line is formed based on the data of the motion start position of the follower element and the data on a start position for starting the synchronism, and a velocity of the follower element is controlled to vary along the linear line from the motion start position to the synchronism start position of the follower element.

8. A synchronous control apparatus according to claim 6, wherein said memory stores data on an acceleration curve for synchronizing and the acceleration control is performed according to the acceleration curve so that the position of the follower element when the acceleration terminates coincides with the start position of the synchronism.

9. A synchronous control apparatus according to claim 6, wherein said memory stores data on an deceleration curve for deceleration and stop of the follower element, and the follower element is decelerated to be stopped according to the deceleration curve so that the follower element is brought out of the synchronism.

10. A synchronous control apparatus according to claim 6, wherein said memory stores data on positional relationships between the leading element and a plurality of follower elements in synchronism, and data on start positions for starting the synchronism of the plurality of follower elements and the leading element so that the plurality of follower elements are independently controlled in synchronism with the leading element.

11. A synchronous control method, comprising:

setting a positional relationship between a leading element and a follower element;

setting a start position for starting a synchronization between the follower element and the leading element;

performing an acceleration control of the follower element at a follower motion start position, preceding the start position for starting the synchronization, such that a velocity of the follower element varies linearly from a velocity at the follower motion start position and a velocity at the start position for starting the synchronization; and performing a position control of the follower element based on position data of the leading element and the set positional relationship after the follower element reaches the start position of the synchronism.

* * * * *

UNITED STATES PATENT AND TRADEMARK OFFICE
CERTIFICATE OF CORRECTION

PATENT NO. : 6,909,938 B2
DATED : June 21, 2005
INVENTOR(S) : Tetsuo Hishikawa et al.

It is certified that error appears in the above-identified patent and that said Letters Patent is hereby corrected as shown below:

Title page,
Item [75], Inventors, change "Fujiyoshida" to -- Yamanashi --.

Column 1,
Line 57, change "reached" to -- reaches --.

Column 2,
Line 7, change "reached" to -- reaches --.
Line 35, change "7m" to -- 7 --.

Column 4,
Line 44, change "term" to -- terms --.
Line 55, change "if" to -- if it --.

Column 5,
Line 8, change "systems" to -- system --.
Line 11, change "not not" to -- not the --.
Line 18, change "form" to -- from --.

Column 7,
Line 25, change "hereby" to -- thereby --.
Line 37, change "reached" to -- reaches --.

Column 8,
Line 25, change "reached" to -- reaches --.
Line 50, change "variation" to -- variations --.

Signed and Sealed this

Twenty-fifth Day of April, 2006

JON W. DUDAS
*Director of the United States Patent and Trademark Office*